United States Patent
Schneider et al.

(10) Patent No.: US 9,546,709 B2
(45) Date of Patent: Jan. 17, 2017

(54) CRANKSHAFT ISOLATING PULLEY

(71) Applicant: THE GATES CORPORATION, Denver, CO (US)

(72) Inventors: Dean Schneider, Washington, MI (US); Alexander Serkh, Troy, MI (US); Keming Liu, Sterling Heights, MI (US)

(73) Assignee: Gates Corporation, Denver, CO (US)

( * ) Notice: Subject to any disclaimer, the term of this patent is extended or adjusted under 35 U.S.C. 154(b) by 338 days.

(21) Appl. No.: 14/482,994

(22) Filed: Sep. 10, 2014

(65) Prior Publication Data
US 2016/0069418 A1    Mar. 10, 2016

(51) Int. Cl.
| | |
|---|---|
| F16D 3/00 | (2006.01) |
| F16H 55/14 | (2006.01) |
| F16H 55/36 | (2006.01) |
| F16H 9/00 | (2006.01) |
| F16H 59/00 | (2006.01) |
| F16H 61/00 | (2006.01) |
| F16H 63/00 | (2006.01) |
| F16F 15/14 | (2006.01) |

(52) U.S. Cl.
CPC .......... *F16F 15/1442* (2013.01); *F16H 55/36* (2013.01); *F16H 2055/366* (2013.01)

(58) Field of Classification Search
CPC .. F16H 55/36; F16H 2055/366; F16D 41/206; F16D 7/022; F02B 67/06
USPC ..................................................... 474/94, 70
See application file for complete search history.

(56) References Cited

U.S. PATENT DOCUMENTS

| | | | | | |
|---|---|---|---|---|---|
| 2,463,100 | A | * | 3/1949 | Gredell | B62M 7/00 192/105 CD |
| 2,866,349 | A | * | 12/1958 | Heckethorn | F02B 67/06 192/41 R |
| 2,885,896 | A | * | 5/1959 | Hungerford, Jr. | F16H 9/04 192/12 BA |
| 6,083,130 | A | * | 7/2000 | Mevissen | F02B 67/06 192/107 T |
| 7,591,357 | B2 | * | 9/2009 | Antchak | F16D 41/206 192/41 S |
| 7,618,337 | B2 | * | 11/2009 | Jansen | F02B 67/06 192/41 S |
| 7,954,613 | B2 | * | 6/2011 | Mevissen | F16D 7/022 192/41 S |

(Continued)

FOREIGN PATENT DOCUMENTS

DE    102009052611 A1    5/2011

OTHER PUBLICATIONS

European Patent Office, International Search Report PCT/US2015/044227, Mailing date Jan. 20, 2016.

*Primary Examiner* — Henry Liu
(74) *Attorney, Agent, or Firm* — Jeffrey A. Thurnau, Esq.; Paul N. Dunlap, Esq.

(57) ABSTRACT

An isolating pulley comprising a hub comprising an inertia carrier, the inertia carrier having an inner surface, a spring carrier journalled to the hub, the spring carrier having a releasable driving engagement with the inertia carrier, a pulley journalled to the hub, a spring drivingly engaged between the spring carrier and the pulley, a clutch spring having a frictional engagement with the inner surface, and which frictional engagement is partially releasable upon a temporary, pressing contact of the pulley upon the clutch spring.

16 Claims, 8 Drawing Sheets

(56) References Cited

U.S. PATENT DOCUMENTS

| | | | |
|---|---|---|---|
| 7,975,821 B2 * | 7/2011 | Antchak | F16D 7/022 192/41 S |
| 8,021,253 B2 * | 9/2011 | Dell | F16D 3/02 464/57 |
| 8,132,657 B2 * | 3/2012 | Antchak | F16D 7/022 192/41 S |
| 8,202,183 B2 * | 6/2012 | Riu | F16D 41/203 474/70 |
| 8,302,753 B2 * | 11/2012 | Antchak | F16D 41/206 192/113.32 |
| 8,419,574 B2 * | 4/2013 | Serkh | F16F 15/1216 474/94 |
| 8,506,434 B2 * | 8/2013 | Harvey | F16D 47/02 192/41 R |
| 8,534,438 B2 * | 9/2013 | Antchak | F16D 41/206 192/113.32 |
| 8,632,431 B2 * | 1/2014 | Pflug | F16H 55/36 474/94 |
| 8,678,157 B2 * | 3/2014 | Ward | F16D 7/022 192/41 R |
| 8,789,670 B2 * | 7/2014 | Antchak | F16D 7/022 192/212 |
| 8,813,928 B2 * | 8/2014 | Schneider | F16D 7/022 192/41 S |
| 8,820,503 B2 * | 9/2014 | Schneider | F16D 41/206 192/41 S |
| 8,888,619 B2 * | 11/2014 | Antchak | F16D 7/022 474/74 |
| 8,931,610 B2 * | 1/2015 | Serkh | F16D 41/206 192/41 S |
| 8,985,293 B2 * | 3/2015 | Marion | F16D 13/76 192/113.32 |
| 9,033,832 B1 * | 5/2015 | Serkh | F16F 15/126 474/70 |
| 2006/0094547 A1 * | 5/2006 | Xu | F16F 15/126 474/94 |
| 2008/0312014 A1 * | 12/2008 | Stief | F16F 15/123 474/94 |
| 2009/0318252 A1 * | 12/2009 | Riu | F16D 41/203 474/94 |
| 2011/0065537 A1 * | 3/2011 | Serkh | F16D 7/022 474/94 |
| 2011/0224038 A1 * | 9/2011 | Aantchak | F16D 7/022 474/94 |
| 2012/0015768 A1 * | 1/2012 | Serkh | F16H 55/36 474/94 |
| 2012/0298474 A1 * | 11/2012 | Ward | F16D 7/022 192/41 S |
| 2013/0087428 A1 | 4/2013 | Antchak et al. | |
| 2013/0217524 A1 * | 8/2013 | Antchak | F02B 67/06 474/94 |
| 2013/0237351 A1 * | 9/2013 | Marion | B60K 25/02 474/70 |
| 2013/0324335 A1 * | 12/2013 | Chen | F16D 41/206 474/94 |
| 2014/0008175 A1 * | 1/2014 | Schneider | F16D 41/206 192/41 S |
| 2015/0276039 A1 * | 10/2015 | Williams | F16D 41/206 474/94 |
| 2015/0285366 A1 * | 10/2015 | Serkh | F16H 55/36 474/94 |

* cited by examiner

CRANKSHAFT ISOLATING PULLEY

FIELD OF THE INVENTION

The invention relates to an isolating pulley, and more particularly, to an isolating pulley having a clutch spring releasably engaged with an inertia carrier inner surface upon a pressing contact of the pulley with the clutch spring.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Ser. No. 13/541,216 which discloses an isolator decoupler having a pulley temporarily engagable with an end of the wrap spring one way clutch in an unwinding direction whereby a temporary contact between the wrap spring one way clutch end and the pulley will temporarily diminish the frictional engagement of the wrap spring one way clutch from the shaft.

What is needed is an isolating pulley having a clutch spring releasably engaged with an inertia carrier surface upon a pressing contact of the pulley with the clutch spring. The present invention meets this need.

SUMMARY OF THE INVENTION

The primary aspect of the invention is an isolating pulley having a clutch spring releasably engaged with an inertia carrier surface upon a pressing contact of the pulley with the clutch spring.

Other aspects of the invention will be pointed out or made obvious by the following description of the invention and the accompanying drawings.

The invention comprises an isolating pulley comprising a hub comprising an inertia carrier, the inertia carrier having an inner surface, a spring carrier journalled to the hub, the spring carrier having a releasable driving engagement with the inertia carrier, a pulley journalled to the hub, a spring drivingly engaged between the spring carrier and the pulley, a clutch spring having a frictional engagement with the inner surface, and which frictional engagement is partially releasable upon a temporary, pressing contact of the pulley upon the clutch spring.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
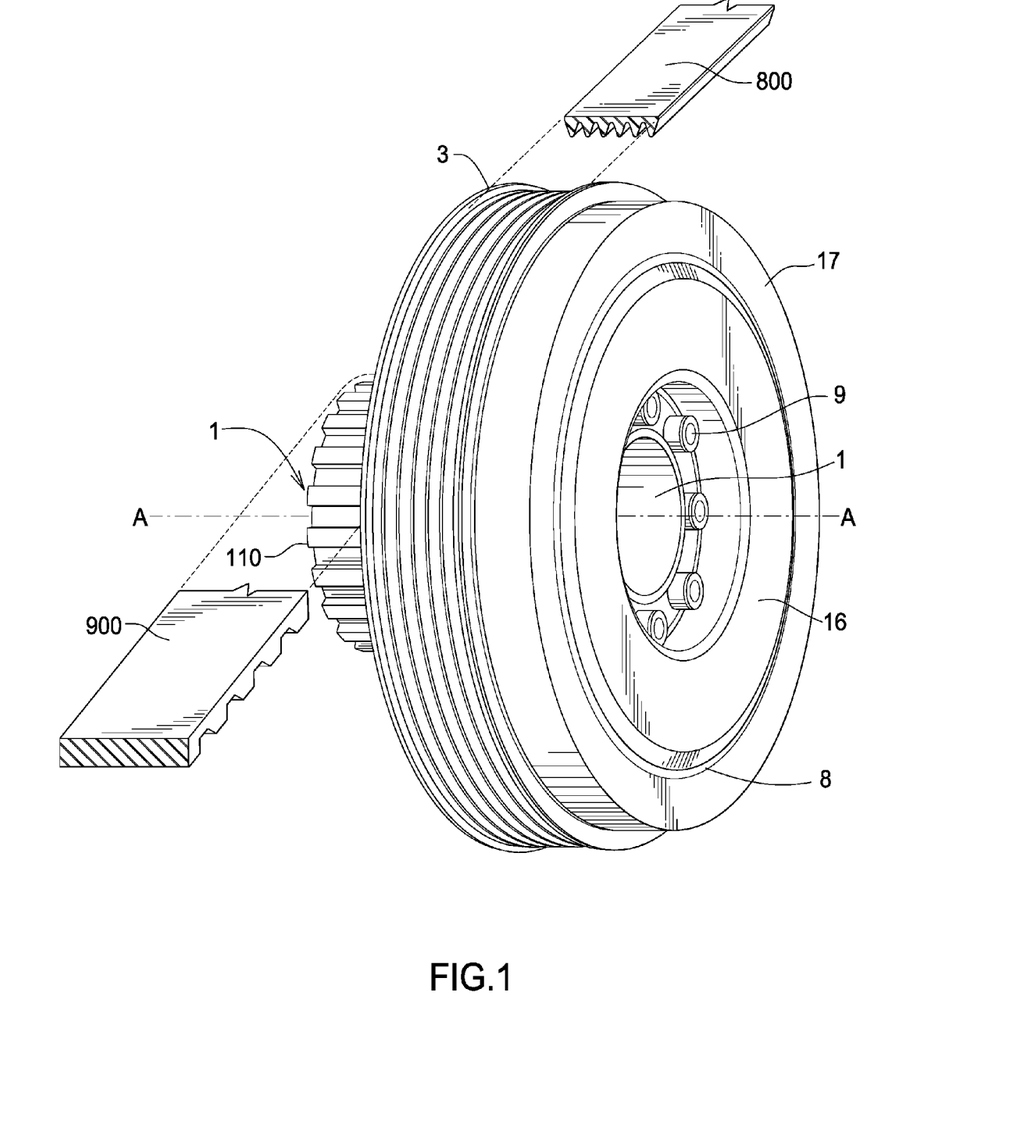
FIG. 1 is a front perspective view of the inventive device.

FIG. 1 is a front perspective view of the inventive device. The device is typically attached to the crankshaft of an internal combustion engine (not shown).

Figure 2:
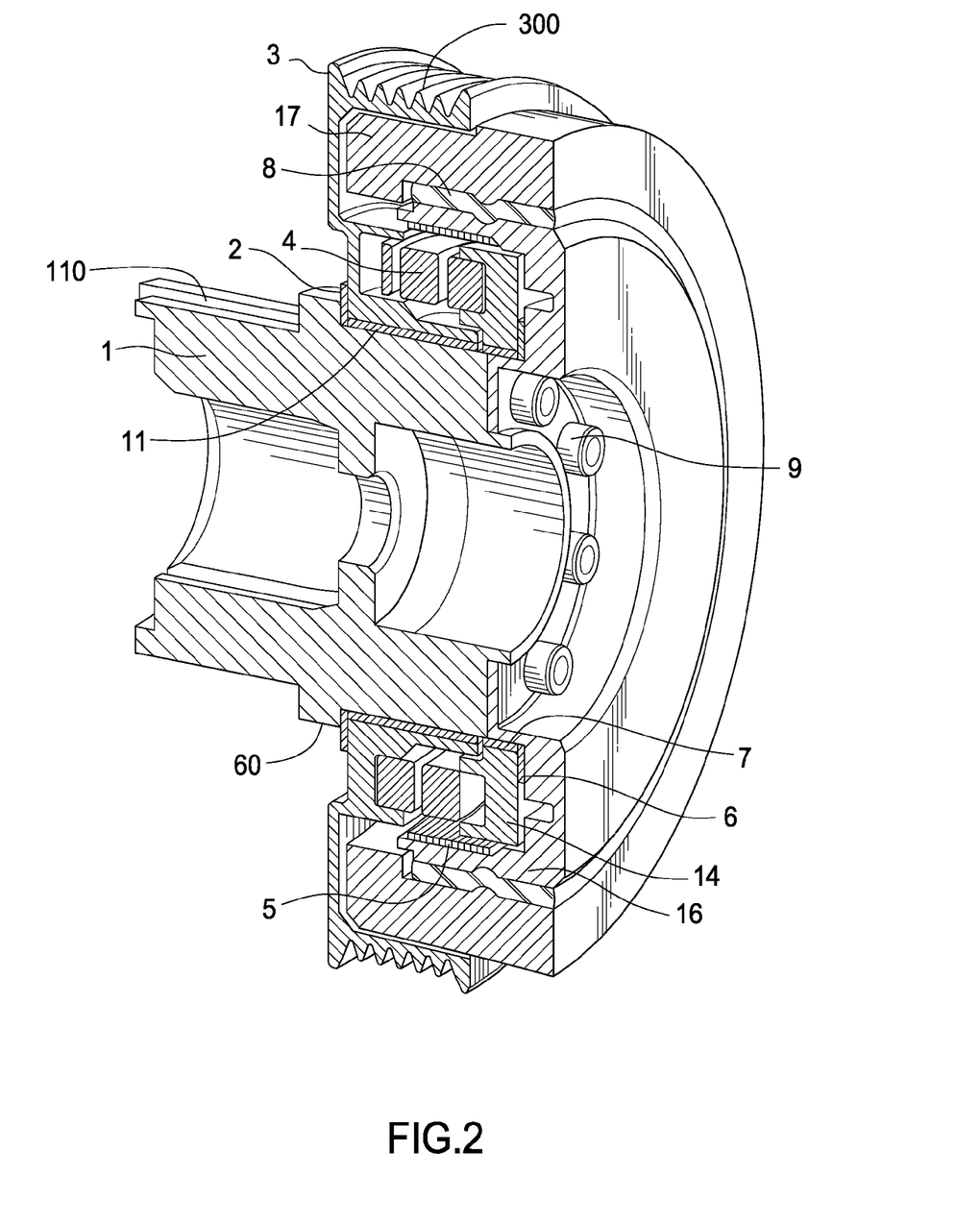
FIG. 2 is a cross-section view of the device.

FIG. 2 is a cross-section view of the device. The inventive device comprises hub 1. Hub 1 further comprises a crankshaft sprocket 110 having a toothed surface. Crankshaft sprocket 110 can be used to drive an engine timing belt 900. Timing belt 900 is referred to as a toothed or synchronous belt.

Thrust bearing 2 engages shoulder 60 on hub 1. Pulley 3 is journalled to hub 1 on bushing 11. Pulley 3 comprises a profile 300 for engaging a multi-ribbed belt 800. The multi-ribbed belt may be used to drive an engine accessory system (not shown). Spring 4 is engaged between pulley 3 and spring carrier 14. Clutch spring 5 is engaged between spring carrier 14 and inertia carrier 16. Spring carrier 14 bears upon thrust bearing 6. Spring carrier 14 is journalled to hub 1 upon bushing 7. Inertia mass 17 is mounted to inertia carrier 16 by rubber member 8. Rubber member 8 comprises a natural or synthetic elasotmeric or polymeric resilient material suitable for damping axial and torsional vibrations which arise from operation of the engine. Fasteners 9 attach inertia carrier 16 to hub 1.

Figure 3:
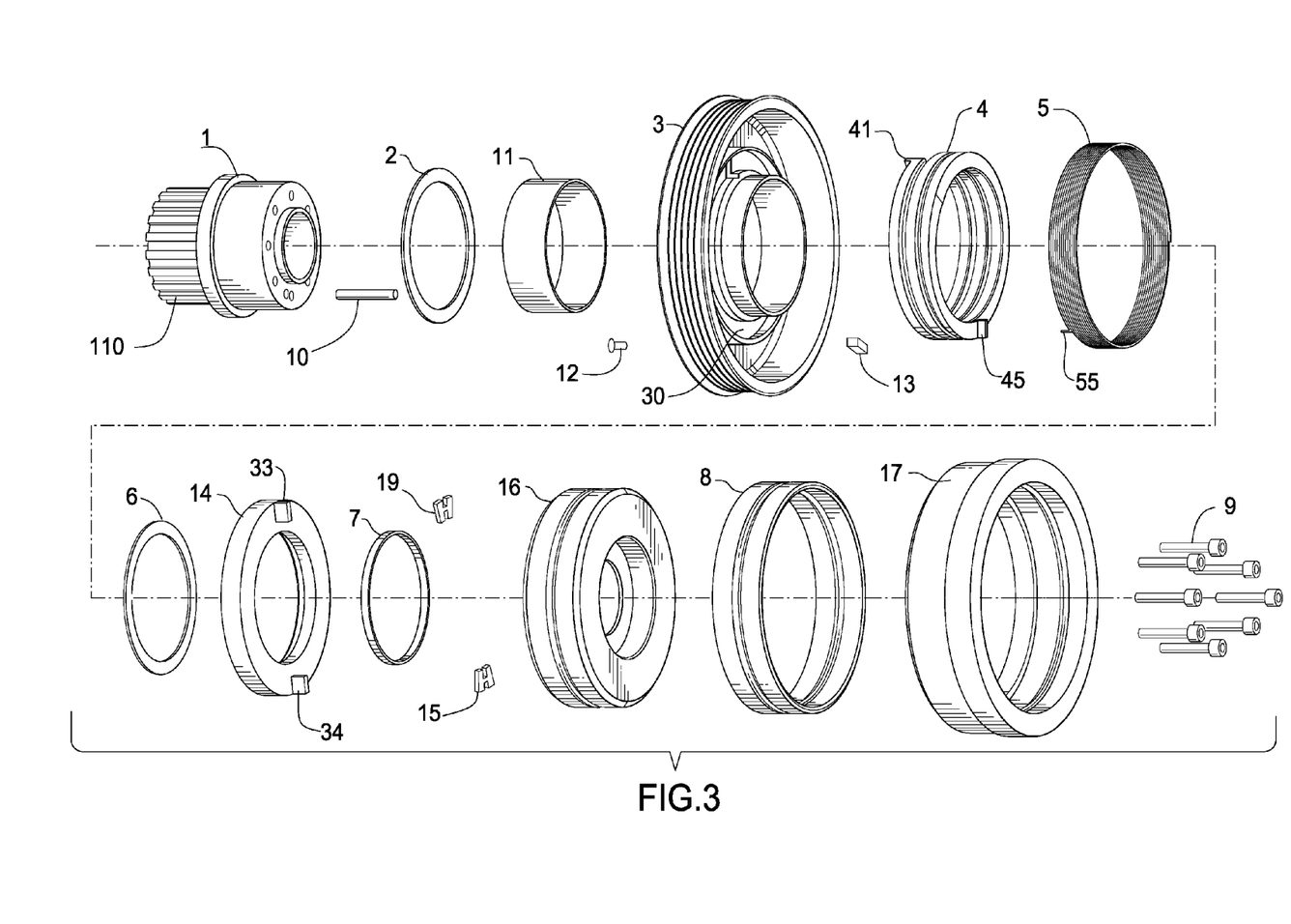
FIG. 3 is an exploded view of the device.

FIG. 3 is an exploded view of the device. Hub 1 is fixedly attached to an engine crankshaft (not shown). Dowel pin 10 is fixedly attached to hub 1. Thrust bearing 2 is located between pulley 3 and hub 1. Bushing 11 is fixed to pulley 3.

Figure 4A:
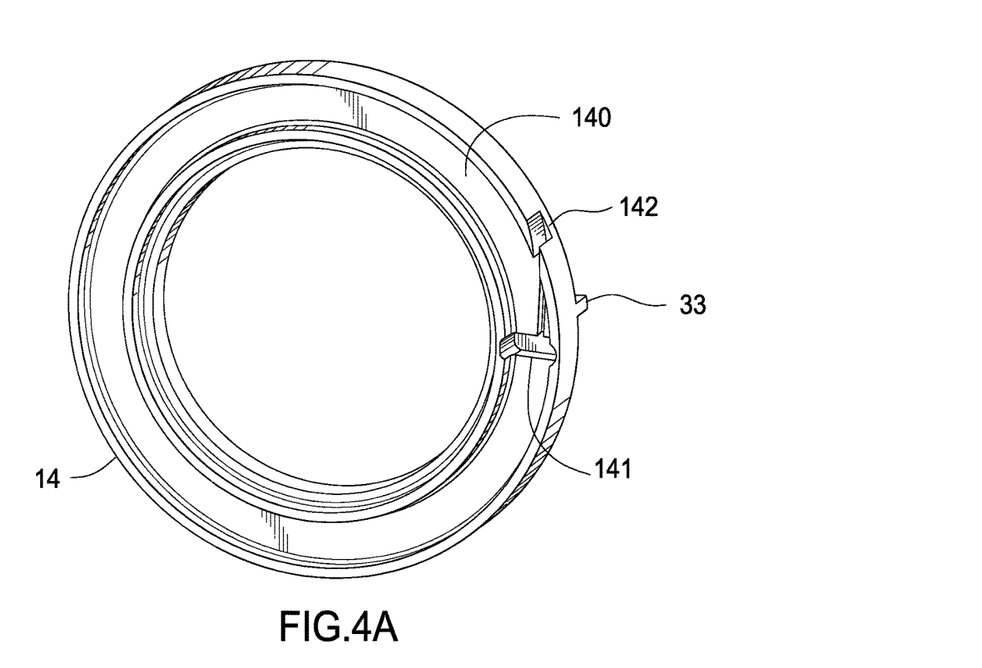
FIG. 4a is a front elevation view of the spring carrier.
Figure 4B:
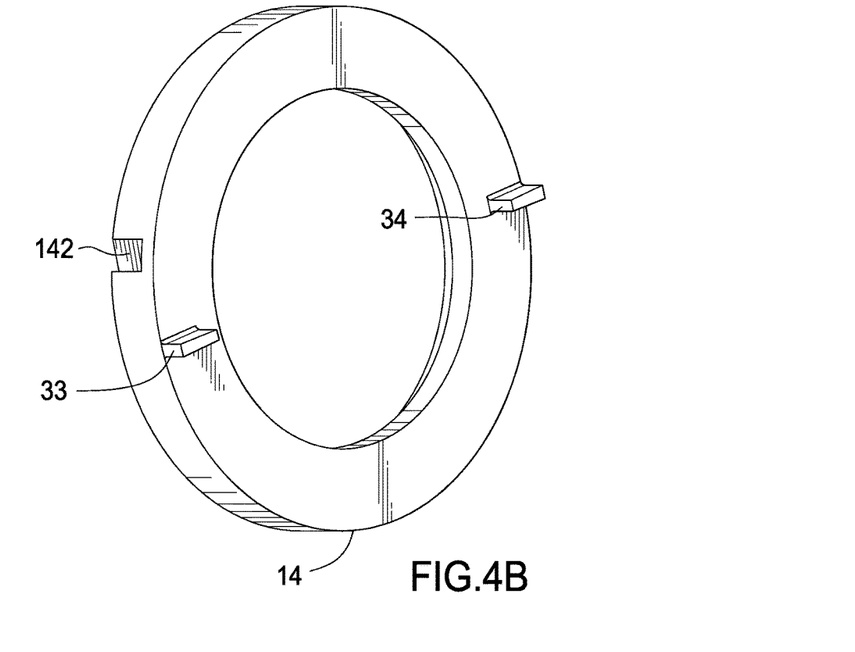
FIG. 4b is a rear elevation view of the spring carrier.

FIG. 4a is a front elevation view of the spring carrier. FIG. 4b is a rear elevation view of the spring carrier. Spring carrier 14 comprises a spring receiving portion 140. Spring end 45 is received by slot 141. Spring surface 46 engages with spring receiving portion 140. Spring surface 46 interfaces with spring carrier portion 140.

Clutch spring 5 engages slot 142. End 56 of clutch spring 5 engages slot 141 whereby clutch spring 5 is retained.

Figure 5A:
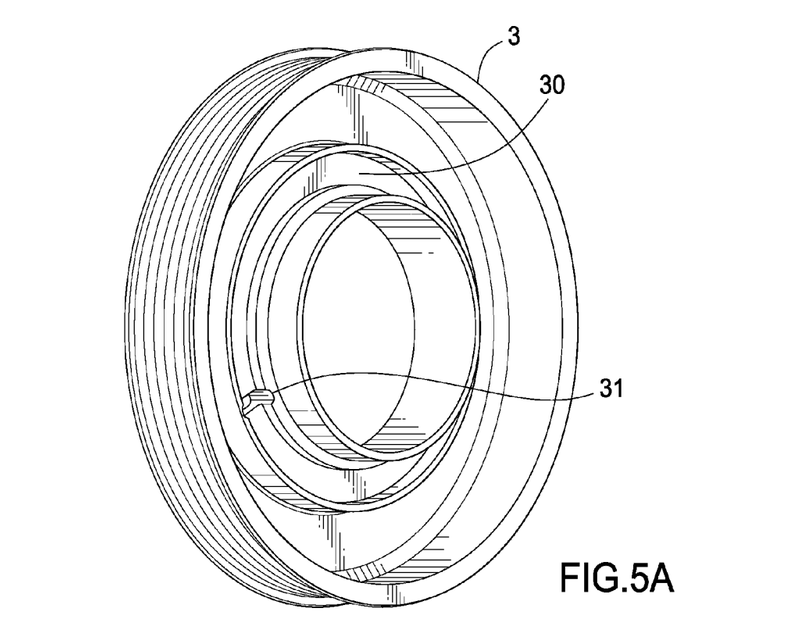
FIG. 5a is a front elevation view of the pulley.
Figure 5B:
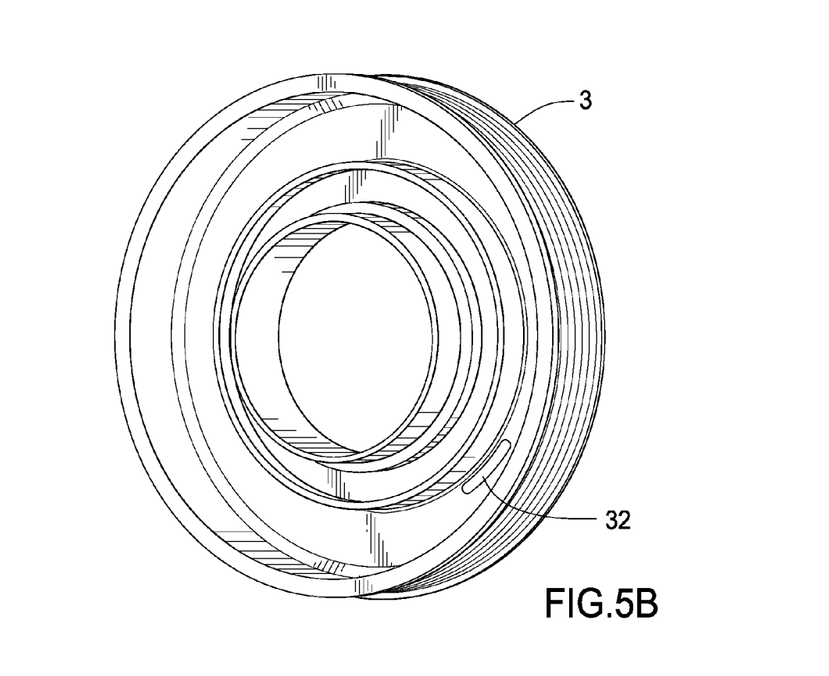
FIG. 5b is a rear elevation view of the pulley.

Pulley 3 comprises a spring receiving portion 30, see FIG. 5a. FIG. 5a is a front elevation view of the pulley. FIG. 5b is a rear elevation view of the pulley. Slot 31 receives an end 40 of spring 4. Spring surface 41 interfaces with spring receiving portion 30.

Figure 6:
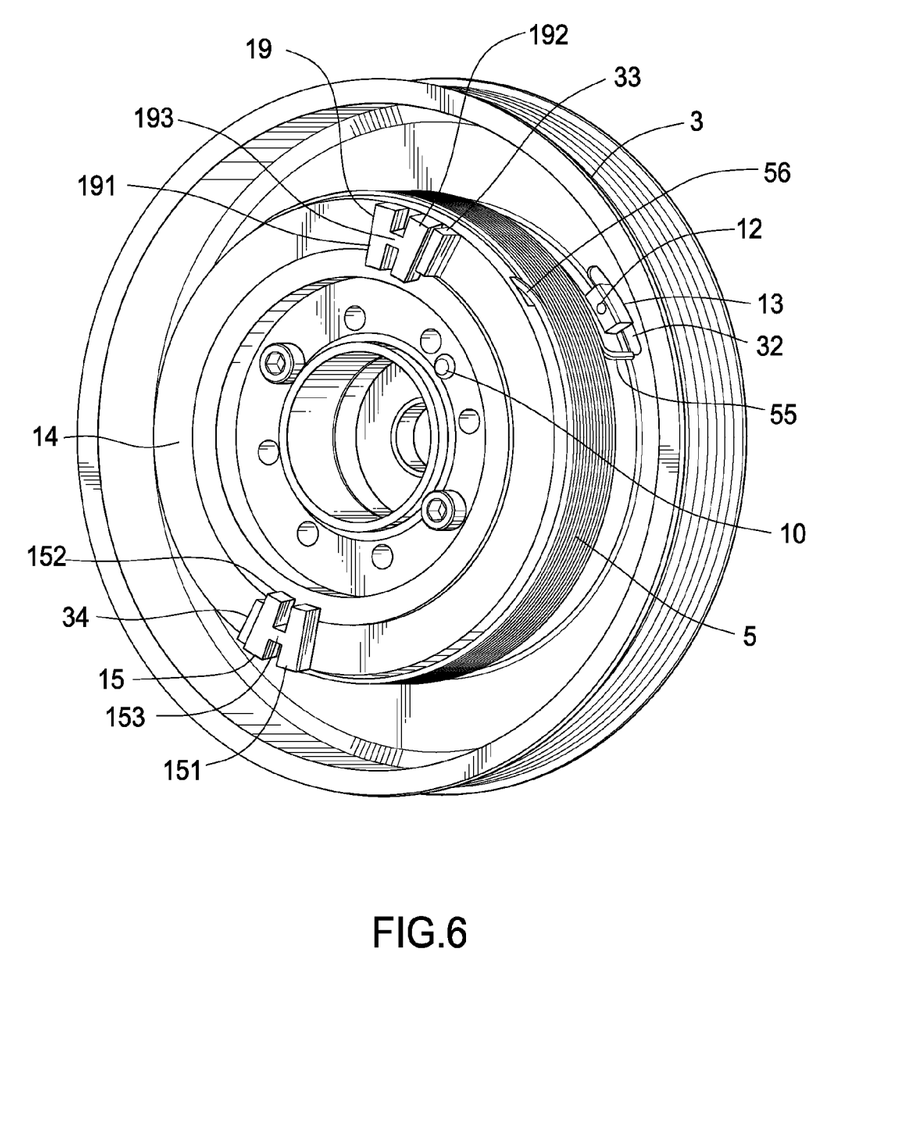
FIG. 6 is an elevation view of the interior of the device.

FIG. 6 is an elevation view of the interior of the device. Release 13 is engaged with slot 32 of pulley 3 and is fastened in place via fastener 12. The position of release member 13 can be adjusted in slot 32 to adjust the release torque. Slot 32 comprises an arc having a constant radius centered on the axis of rotation A-A.

Bumper 15 comprises elongate portion 151 and elongate portion 152 joined by connecting member 153. Bumper 19 comprises elongate portion 191 and elongate portion 192 joined by connecting member 193.

Figure 7A:
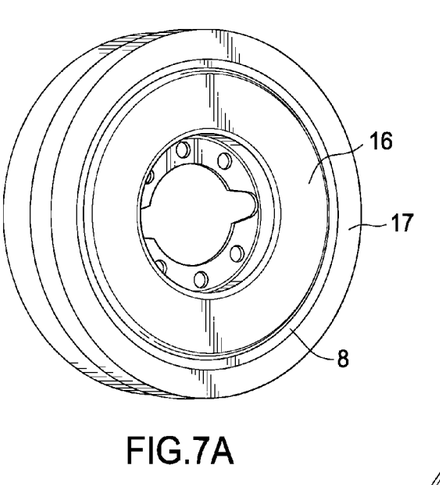
FIG. 7a is an elevation view of the front of the inertia mass.
Figure 7B:
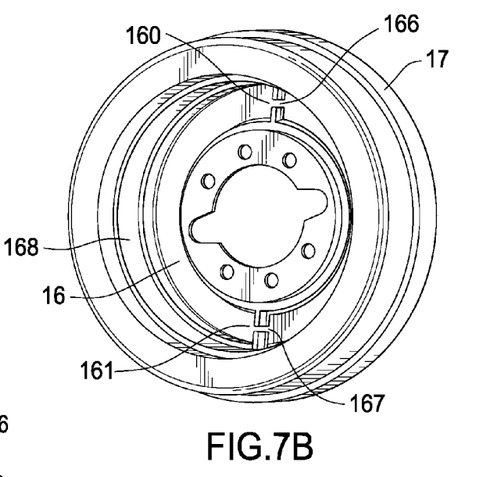
FIG. 7b is an elevation view of the rear of the inertia mass.

FIG. 7a is an elevation view of the front of the inertia mass. FIG. 7b is an elevation view of the rear of the inertia mass. Connecting member 153 of bumper 15 nests in slot 167 and around tab 161. Elongate member 151 and elnongate member 152 are disposed on opposing sides of tab 161. Connecting member 193 of bumper 19 nests in slot 166 and around tab 160. Elongate member 191 and elongate member 192 are disposed on opposing sides of tab 190. Bumper 15 and bumper 19 comprise any suitable resilient, compliant or compressible material for absorbing the force of engagement with tabs 33 and 34. Tabs 33, 34 comprise projecting members.

Figure 8:
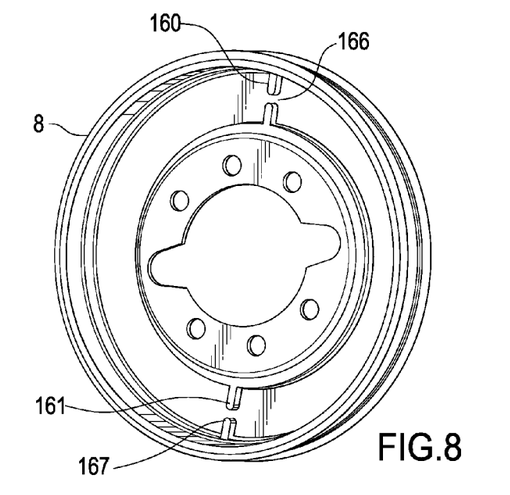
FIG. 8 is an elevation view of the interior of the inertia carrier.

FIG. 8 is an elevation view of the interior of the inertia carrier. Inertia carrier 16 has tab 160 and tab 161. Tab 160 and tab 161 are configured with slot 166 and slot 167 respectively. Tab 160 comprises face 162 and face 163. Tab 161 comprises face 164 and face 165. Spring carrier tabs 33 and 34 engage bumpers 15 and 19.

Figure 9A:
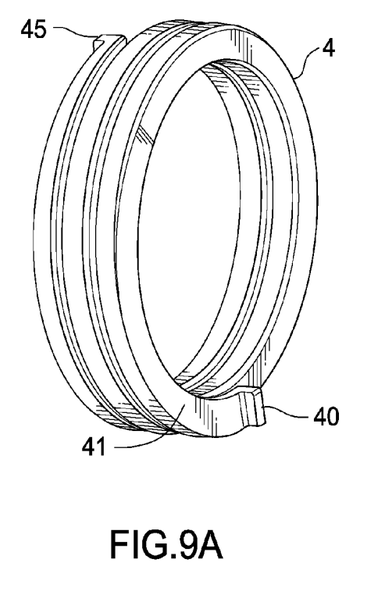
FIG. 9a is a detail of the spring.

FIG. 9a is a detail of the spring. Spring 4 comprises a tab 45 at a first end and a tab 40 at a second end. Flat surface 46 allows more of the spring coil to seat on the spring carrier and thereby avoid distortion. Flat surface 41 allows more of the spring coil to seat on the pulley and thereby avoid distortion. Each of flat surface 41 and 46 causes the respective end of spring 4 to have a tapered form.

Figure 9B:
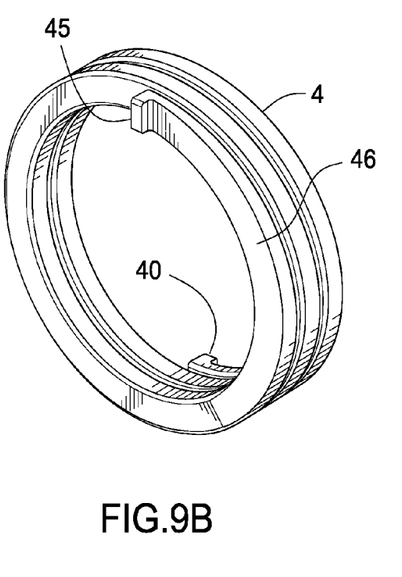
FIG. 9b is a detail of the spring.
Figure 9C:
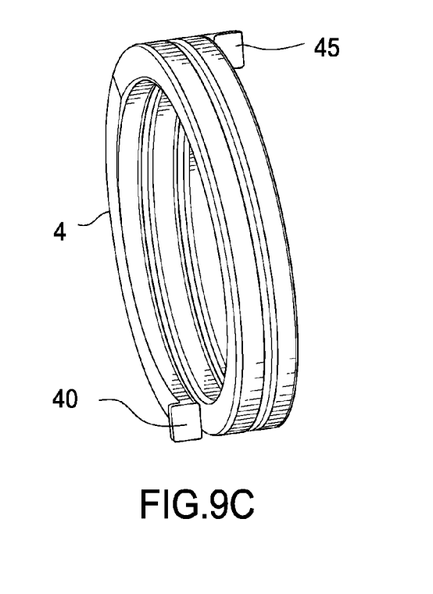
FIG. 9c is a detail of the spring.

FIG. 9b is a detail of the spring. FIG. 9c is a detail of the spring. Spring 4 comprises a coil spring. Spring 4 may be loaded in either the winding or unwinding direction. The torsional spring rate is in the range of approximately 2 Nm/deg to approximately 5 Nm/deg.

In normal operation the engine drives the accessory drive with torque flowing from pulley 3 to the accessory drive belt and system. The system can comprise an alternator, water pump, AC compressor or power steering. During normal operation an operational condition known as overrun also occurs. Overrun occurs when there is a deceleration of the engine from a higher rpm, such as slowing or approaching a stop light. Although engine speed decreases the accessories will momentarily continue operating at a higher speed of rotation due to their combined inertia. The overrun condition causes the accessory belt to reverse its loading on the crankshaft such that it temporarily drives the crankshaft.

In driving operation torque transmission in the inventive device is from hub 1 to inertia carrier 16, to tabs 160 and 161, to bumpers 15 and 19, then to spring carrier 14 through spring 4 to pulley 3 and then to a belt to drive the accessories (not shown). Spring 4 is typically driven in an unwinding direction, but may also be driven in a winding direction with equal success. Tabs 160 and 161 apply force to bumpers 15 and 19 which in turn apply force to spring carrier 14 through tabs 33 and 34. Tabs 33, 34 project from spring carrier 14. Spring carrier 14 applies force to spring 4 through tab 45 engaged with slot 141. Spring 4 applies force to pulley 3 via engagement of tab 40 with slot 31.

In the overrun condition torque transmission reverses. Torque transmission is from pulley 3 to spring 4 to spring carrier 14 to clutch spring 5 to inertia carrier 16 to hub 1.

During overrun conditions the device limits overrun torque applied to pulley 3 to levels that do not exceed a predetermined release amount, for example, 15 Nm. Pulley 3 applies torque to spring 4. Spring 4 applies the torque to spring carrier 14 which applies it to clutch spring 5 which in turn applies it to inertia carrier 16. Reverse rotation of pulley 3 allows release member 13 to rotate toward clutch spring tab 55 until contact is made. Overrun protection is then accomplished through the release of engagement of clutch spring 5 from inner surface 168 of inertia carrier 16. Inner surface 168 has a cylindrical form and faces radially inward toward the axis of rotation.

Clutch spring 5 is released from surface 168 upon pressing contact of release 13 with clutch spring tab 55 because clutch spring 5 is thereby wound in a winding direction which causes clutch spring 5 to radially contract, which in turn causes clutch spring 5 to disengage from surface 168 of inertia carrier 16. Disengagement allows pulley 3, spring 4, spring carrier 14 and clutch spring 5 to rotate in unison relative to inertia carrier 16. This in turn causes spring carrier tabs 33 and 34 to lose contact with bumper 15 and bumper 19. However, clutch spring 5 does not completely disengage from inertia carrier 16. Through frictional drag there continues to be overrun or release torque applied to inertia carrier 16 through clutch spring 5. If the torque drops below the predetermined release torque, spring 5 locks to surface 168 and the relative rotational motion stops.

The position of release member 13 is adjustable within slot 32. The position of release member 13 determines the torque at which the release member 13 engages end 55. Adjustment can be used to either increase or decrease the torque threshhold at which release of clutch spring 5 occurs.

If the overrun torque continues, pulley 3, spring 4, spring carrier 14 and clutch spring 5 rotate with respect to inertia carrier 16. Relative motion can continue until spring carrier tab 33 and tab 34 come into contact with the opposite sides of bumpers 15 and 19 after approximately 180° of rotation from the drive position. Contact between the tabs 33, 34 and bumpers 15, 19 limits the amount of overrun rotation in the inventive device.

Upon return to normal operation wherein the engine is driving the accessories, inertia carrier 16 rotates relative to pulley 3, spring 4, spring carrier 14 and clutch spring 5 until spring carrier tab 33 and tab 34 come back into contact with bumpers 15 and 19. This represents approximately 180° of rotation from the overrun position.

An advantage of the device is control of the effective inertia torque of all driven components on the crankshaft pulley due to engine deceleration so that system problems such as noise and vibration are significantly reduced. Further, dynamic belt slip, span vibration and tensioner arm vibration are reduced or eliminated. Further, controlled overrun reduces the crankshaft rotational vibration or speed fluctuation which is the primary excitation of the belt drive system.

Numerical information is provided by way of example and is not intended to limit the scope of the invention.

Although a form of the invention has been described herein, it will be obvious to those skilled in the art that variations may be made in the construction and relation of parts without departing from the spirit and scope of the invention described herein.

We claim:
1. An isolating pulley comprising:
a hub (1) comprising an inertia carrier (16), the inertia carrier having an inner surface (168);
a spring carrier (14) journalled to the hub, the spring carrier having a releasable driving engagement with the inertia carrier;
a pulley (3) journalled to the hub;
a spring (4) drivingly engaged between the spring carrier and the pulley;
a clutch spring (5) having a frictional engagement with the inner surface; and which frictional engagement is partially releasable upon a temporary, pressing contact of the pulley upon the clutch spring.

2. The isolating pulley as in claim 1 further comprising an inertia member engaged with the inertia carrier, a damping member disposed between the inertia carrier and the inertia member.

3. The isolating pulley as in claim 1, wherein the hub further comprises a toothed surface.

4. The isolating pulley as in claim 1, wherein the spring is driven in an unwinding direction.

5. The isolating pulley as in claim 1, wherein the pulley comprises an adjustable release member to adjust an engagement torque with the clutch spring.

6. An isolating pulley comprising:
   a hub comprising an inertia carrier, the inertia carrier having an inner surface;
   a spring carrier journalled to the hub, the spring carrier having a releasable driving engagement with the inertia carrier;
   a pulley journalled to the hub, the pulley comprising an adjustable release member to adjust an engagement torque with the clutch spring;
   a spring drivingly engaged between the spring carrier and the pulley;
   a clutch spring having a frictional engagement with the inner surface; and
   which frictional engagement is partially releasable upon a temporary, pressing contact of the pulley upon the clutch spring.

7. The isolating pulley as in claim 6 further comprising an inertia member engaged with the inertia carrier, a damping member disposed between the inertia carrier and the inertia member.

8. The isolating pulley as in claim 7, wherein the hub further comprises a toothed surface.

9. The isolating pulley as in claim 8, wherein the spring is driven in an unwinding direction.

10. An isolating pulley comprising:
    a hub comprising an inertia carrier, the inertia carrier having an inner surface;
    an inertia member engaged with the inertia carrier, a damping member disposed between the inertia carrier and the inertia member;
    a spring carrier journalled to the hub, the spring carrier having a releasable driving engagement with the hub;
    a pulley journalled to the hub, the pulley comprising an adjustable release member to adjust an engagement torque with an end of the clutch spring;
    a spring drivingly engaged between the spring carrier and the pulley;
    a clutch spring having a frictional engagement with the inner surface; and
    which frictional engagement is partially releasable upon a temporary, pressing contact of the pulley upon the clutch spring in a winding direction.

11. The isolating pulley as in claim 10, wherein:
    the spring carrier comprises a projecting member engagable with a cooperating member projecting from the hub.

12. The isolating pulley as in claim 11, wherein:
    the cooperating member projecting from the hub comprises a resilient material.

13. The isolating pulley as in claim 12, wherein the pulley comprises an adjustable release member to adjust an engagement torque with the clutch spring.

14. The isolating pulley as in claim 13, wherein the spring is driven in an unwinding direction.

15. The isolating pulley as in claim 14, wherein the hub comprises a toothed surface.

16. The isolating pulley as in claim 15, wherein the pulley comprises a multi-ribbed surface.

* * * * *